April 19, 1938.     J. S. BARNES ET AL     2,114,284
MACHINE TOOL AND CONTROL THEREFOR
Original Filed Aug. 28, 1933     8 Sheets-Sheet 8

Fig. 12

Fig. 13
ROUGH BORE
STATION #2

Fig. 14
ROUGH BORE
REMAINDER
STATION #3

Fig. 15
SEMI-FINISH BORE
SMALL HOLE
STATION #4

Fig. 16
FINISH REAM
STATION #5

Inventors
John S. Barnes
Paul R. Guirl
Ernest J. Svenson
By Cox & Moore
Attys

Patented Apr. 19, 1938

2,114,284

UNITED STATES PATENT OFFICE 2,114,284

MACHINE TOOL AND CONTROL THEREFOR

John S. Barnes, Paul R. Guirl, and Ernest J. Svenson, Rockford, Ill.; Hope Barnes, executrix of said John S. Barnes, deceased, assignor to W. F. & John Barnes Company, Rockford, Ill., a corporation of Illinois Application August 28, 1933, Serial No. 687,060
Renewed December 28, 1936

16 Claims. (Cl. 77—23)

This invention relates generally to machine tools and controls therefor, and more particularly to machine tools whereby a series of cutting operations may be performed upon a work piece, and also relates to improved control mechanism for such machine tools.

One of the important objects of this invention is to provide a machine tool having certain unitary structural features of design and control, which enable a single machine to be used for machining work pieces, which vary in shape and design over a relatively wide range. In other words, the invention contemplates the provision of a machine tool which is particularly adapted for "standardized" production. That is to say, the invention relates to machines made up of a plurality of units, each unit including relatively shiftable work and tool holders. These units may be detached and replaced by other similar units without the necessity of completely rebuilding the machine, and, in fact, without incurring any appreciable additional expense. Thus, the invention contemplates a machine and controls therefor, which include as main structural sections thereof, standardized parts, namely, parts which need not be rebuilt or modified in order to render the machine adaptable for performing a wide range of machining operations.

More specifically, the invention contemplates the provision of a machine which is made up of a plurality of working units, each unit including a reciprocable rotary spindle and means for imparting reciprocation thereto at various speeds. These units are arranged upon a suitable support in accordance with the number of operations which are to be performed upon a work piece, and each unit is capable of independent control, as well as control which enables the synchronized functioning of all the units.

It is an object of the invention in providing above mentioned working units not only to utilize the same working structure for a wide variety of machines, but also to enable the continued operation of the machine, even though one of the units should experience a breakdown. In other words, the invention contemplates an arrangement of working units which enables the machine equipped therewith to continue to function, even though one or more of the units may be temporarily rendered functionally inoperative.

Another object of the invention is to so arrange the above mentioned working units that the timing thereof may be conveniently accomplished in a novel and expeditious manner. In this connection it will be understood that machines of the type contemplated by this invention have a practical application in instances where a group of machines are simultaneously employed to perform various operations upon a work piece, and which are frequently used in combination with mechanical work conveyors, which are timed in accordance with the synchronized functioning of the machines. Accordingly the invention proposes the use of an independent hydraulic control for each work unit to thereby enable flexibility in the timing of said units, so that any variation in cycle of operation can be obtained for each unit. Conventional controls with which we are familiar, do not permit of the above mentioned independent control, and hence are not readily adaptable for performing varied machining operations as contemplated by the present invention.

More specifically, the invention contemplates a single control for each working unit in combination with a control for initiating the simultaneous functioning of all the units, and the accuracy with which said control is accomplished is made possible by an improved hydraulic system of control.

Another object of the invention is to provide a machine tool wherein a plurality of working units of the above mentioned type may be grouped around a center support such as a vertical, horizontal, or angularly disposed column.

A further object of the invention is to provide in a structure of the above mentioned type an improved system of hydraulic control whereby a succession of machining operations may be performed with the utmost accuracy and with a minimum amount of effort and skill on the part of the operator, and to this end the invention contemplates a novel hydraulic transmission equipped with a control arrangement which will permit independent cycles of operation of each work unit and synchronous functioning of all the units without employing any positive driving connection such as lead screws, worm drives, and the like.

Still another object of the invention is to provide a novel and practical hydro-electric control for a machine tool, which is arranged to interlock the movement of the working unit heads with the movement of an index table, whereby to prevent any breakage of tools and the like during the operation of the machine.

A still further object of the invention is to provide a machine tool of the type mentioned above, wherein each working unit includes a spindle head capable of multi-speed feed, and each head is equipped with a propelling mechanism such as a variable displacement pump which functions to independently control the variable feed of the head in accordance with the requirements of the work to be performed by the tools in the head.

Another object of the invention is to provide in combination with an actuator for propelling machine tools of the above mentioned type a closed circuit arrangement whereby uniform travel of the tool per each revolution thereof is obtained irrespective of variation in speeds experienced by the prime mover which drives said tools.

Still another object is to eliminate the use in machines of the above mentioned type, of conventional clutch mechanisms and similar transmissions, and to this end it is proposed to intermittently connect a feed pump within a closed circuit in such a manner as to positively govern the speed of travel irrespective of the direction of the load experienced by the part which is hydraulically shifted.

The foregoing and numerous other objects and advantages will be more apparent from the following detailed description when considered in connection with the accompanying drawings wherein—

Figure 2:
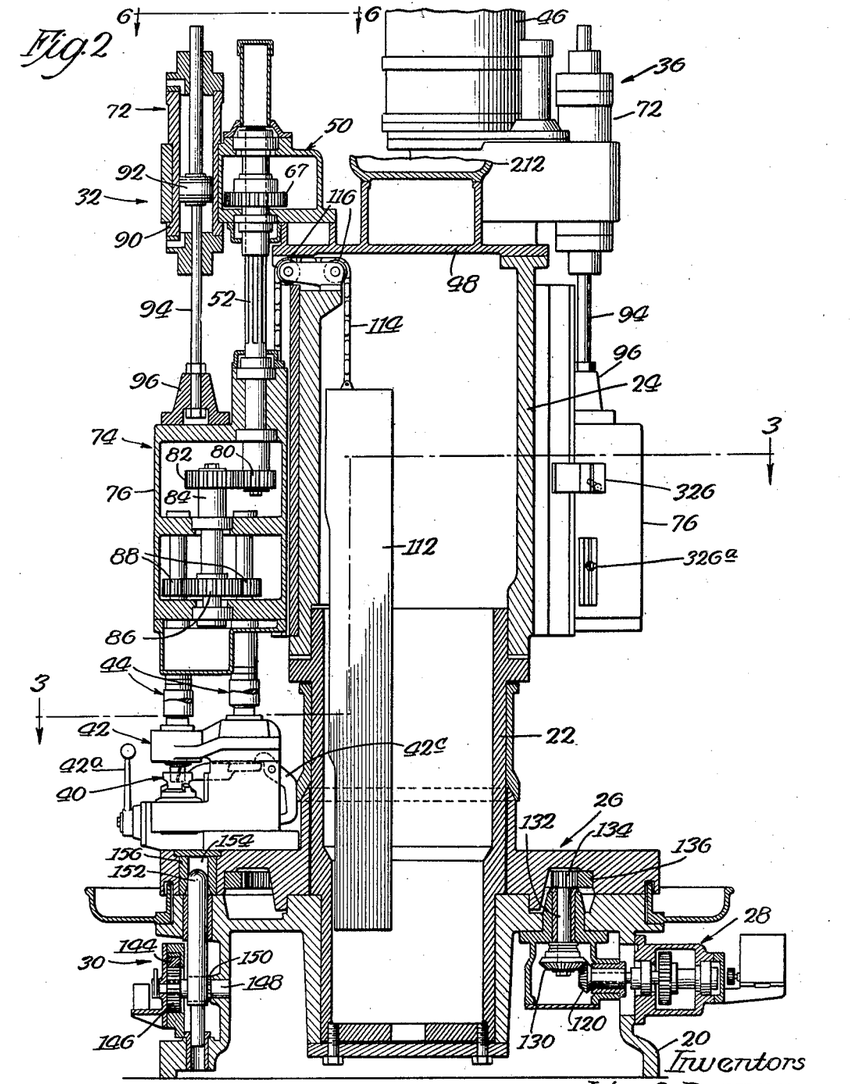
Figure 2 is a vertical sectional view of the machine taken substantially along the line 2—2 of Figure 1.

Referring now to the drawings wherein like numerals have been employed to designate similar parts throughout the various figures, it will be observed that one embodiment of the present invention includes a center column machine having a base 20, Figure 2, which serves as a support for a centrally located, upright column member 22, which, in turn, carries an upper column section 24. The base 20 also rotatably supports a shiftable work carrying table 26 which is adapted to be indexed by mechanisms denoted generally by the numerals 28 and properly located by a mechanism 30, later to be described.

Figure 1:
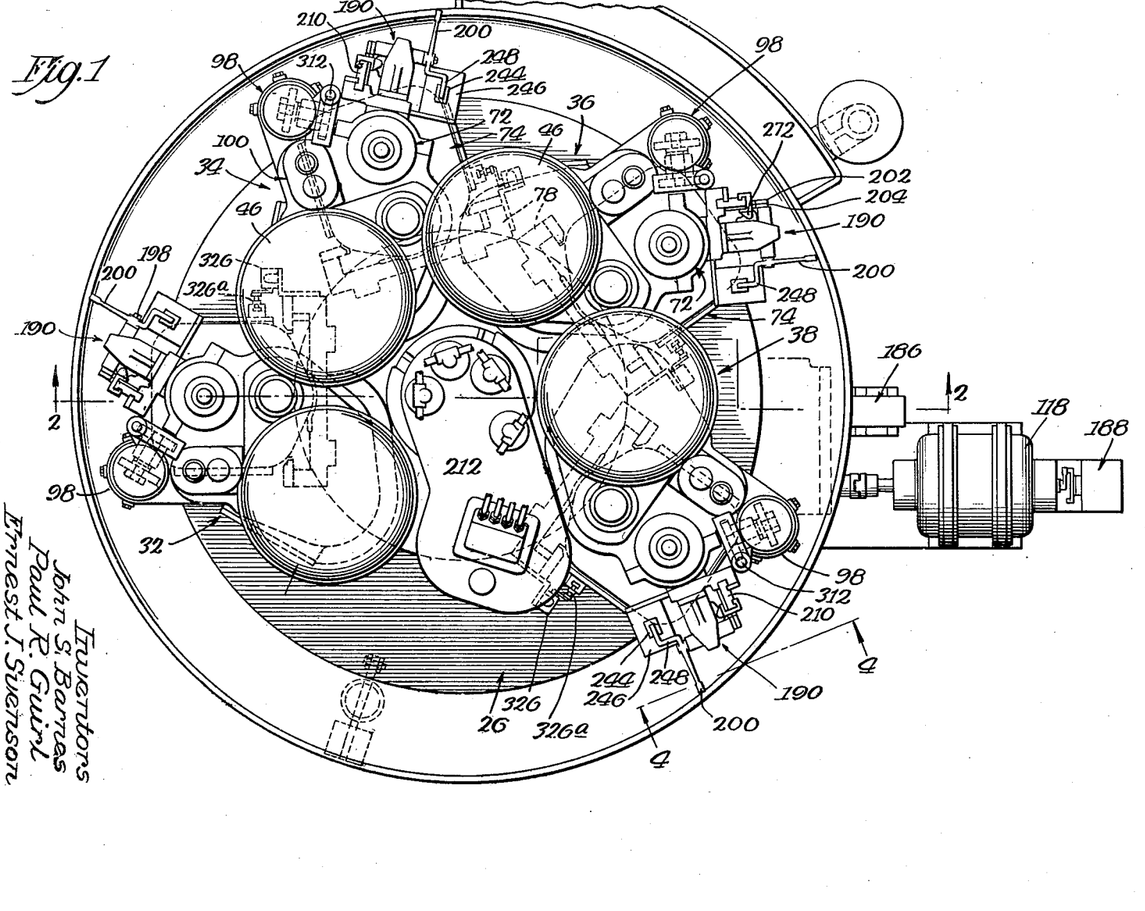
Figure 1 is a plan view of a machine of the center column type embodying features of the present invention.

Associated with the upper column section 24 are four tool spindle actuating units designated generally by the numbers 32, 34, 36, and 38, Figure 1. The units 32 and 38 are separated sufficiently to provide a loading station, thereby enabling a work piece 40 to be initially clamped within a holder 42 before said holder and work piece are indexed into position beneath the unit 32, Figure 2. Upon the completion of one reciprocation of the tool spindle 44 of the unit 32, the mechanism 28 operates to automatically shift the table 26 so as to carry the work piece 40 into position beneath the unit 34. These cycles of reciprocation are repeated until the cutting tools of all four units have performed their intended operations upon the work piece, and when said work piece is again indexed to the starting or loading station, a new work piece is inserted in the holder. It will thus be apparent that after each cycle of reciprocation of the tools, a completed work piece is indexed to the loading position and another work piece is inserted in its place. While in the drawings a machine equipped with six stations is disclosed, it will be apparent that the number of stations may be greater or less, depending entirely upon the nature of the work to be performed. In other words, the device disclosed in this application merely illustrates one practical adaptation of the invention.

*Spindle driving unit*

All of the units 32, 34, 36, and 38 are identical in construction and hence a detailed description of one unit will suffice for all. Each working or driving unit includes a prime mover or electric motor 46, which is mounted upon a frame 48 at the upper end of the column section 24. A frame or housing 50 carried by the frame 48 supports a transmission made up of a plurality of gears, one group or train of gears shown in Figure 7, serving to impart rotation to a spindle shaft 52, said train including a gear 54 driven from a main driving pinion 56 driven directly from the motor shaft 58. The gear 54 drives through gears 60, 65, 66 and 67, Figures 6 and 7. The gear 67 is secured to a splined sleeve 68 which slidably receives the spindle shaft 52. Roller bearings 70 provide a support for the sleeve as clearly shown in Figure 7. A hydraulic actuator designated generally by the numeral 72 is mounted upon the housing 50, and the spindle shaft extends downwardly to receive a spindle head 74, Figure 2.

Figures 3, 3A:
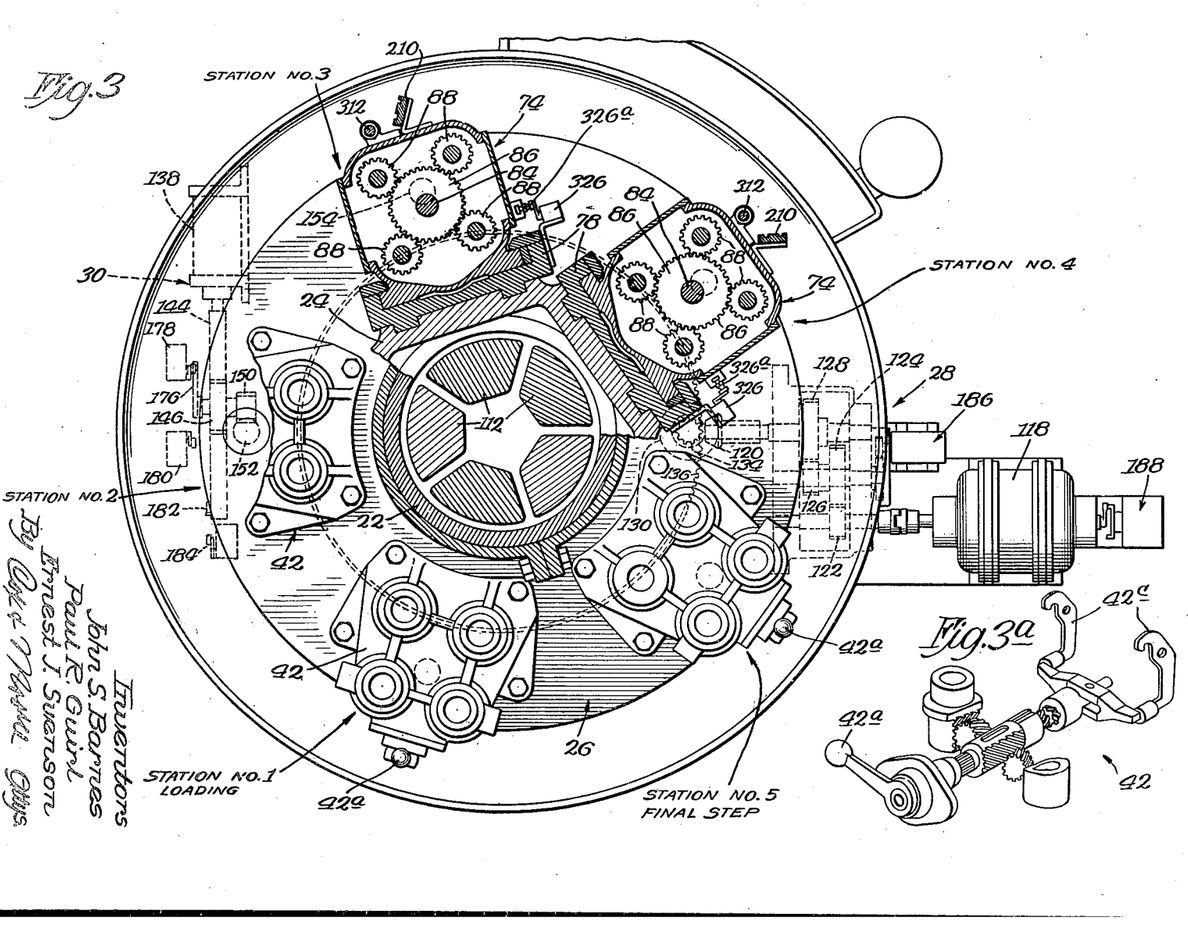
Figure 3 is a horizontal sectional view of the machine taken substantially along the line 3—3 of Figure 2.
Figure 3a is a perspective view of the clamping or work holding device, said view being shown to more clearly illustrate the structural characteristics thereof.

As clearly shown in Figure 2, the spindle head includes a head frame or housing 76 which is vertically reciprocable within guides 78, Figure 3, said guides being secured as a unit to the upper column section 24. The lower extremity of the spindle shaft 52 extends within the head frame 76 and carries a pinion 80, which meshes with a gear 82 mounted upon the upper end of a drive shaft 84. The lower end of the shaft 84 carries a gear 86, which meshes with four tool spindle driving gears 88. Each of the gears 88 connects with and drives a companion tool spindle 44. Thus each spindle head is provided with at least four tool driving spindles. The gears 80 and 82 are pickoff gears to enable variable spindle speeds.

The hydraulic actuator 72 includes a cylinder 90, a piston 92 therein, which, through the agency of a piston rod 94 and a bracket 96, is coupled with the head frame 76, Figure 2. It will thus be apparent from the foregoing description that reciprocation of the head 74 and consequently the tools supported thereby is effected by the hydraulic actuator 72, and rotation of the tools is caused by the gear trains and spindle shaft driven from the motor 46.

Figures 6, 7, 8:
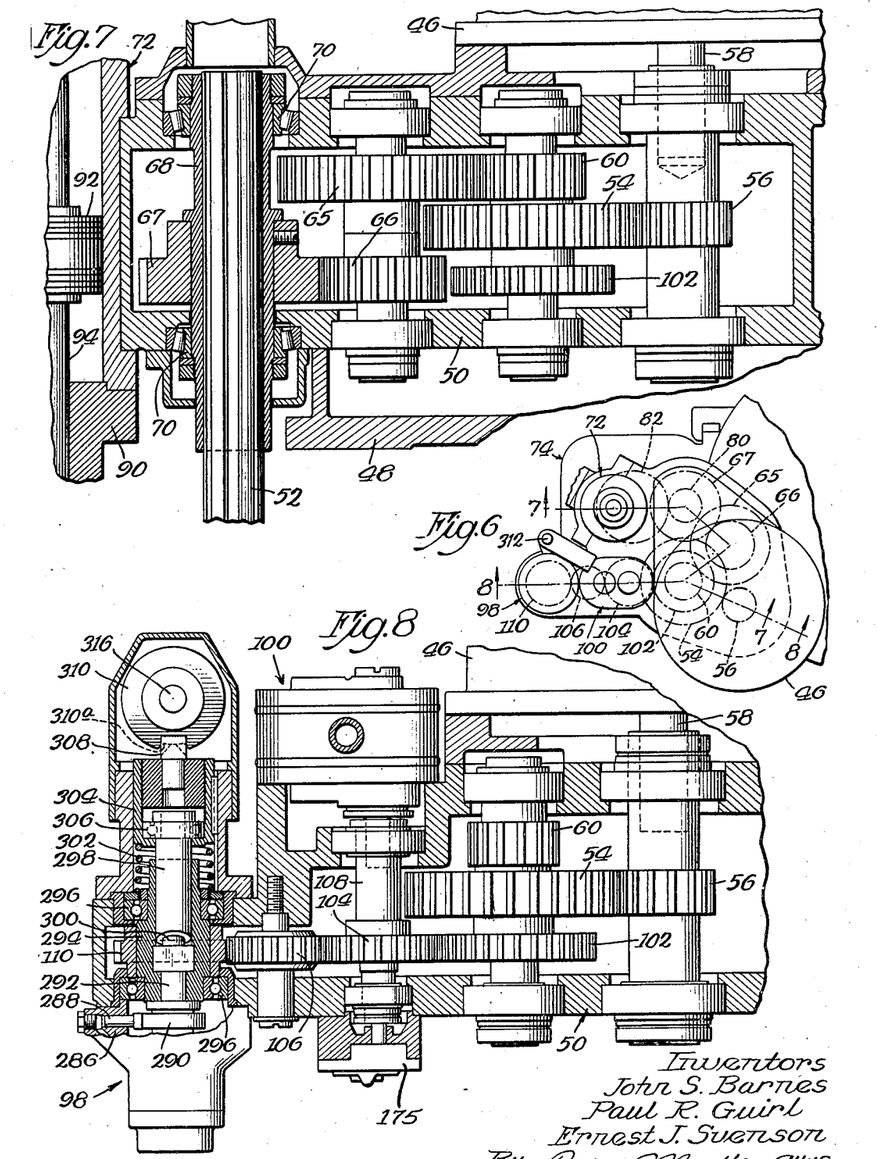
Figure 6 is a detailed plan view of a spindle unit as shown along the line 6—6 of Figure 2, which unit includes a hydraulic actuator, spindle transmission, pump transmission and prime mover or electric motor.
Figure 7 is an enlarged vertical sectional view of the tool spindle transmission, said view being taken substantially along the line 7—7 of Figure 6.
Figure 8 is an enlarged vertical sectional view of the pump driving transmission, taken substantially along the line 8—8 of Figure 6.

A second gear train driven from the pinion 56 within the housing 50 serves to drive a feed pump 98 and a rapid traverse pump 100 (see Figure 8). The gear train includes the gear 54 which is driven directly from the pinion 56, and gears 102, 104 and 106. The gear 104 through a shaft 108 drives one of the gears of the rapid traverse or gear pump 100, while the gear 106 meshes with a gear 110, forming a part of the feed pump structure. It will also be noted that the shafts in the housing 50, which support the gears just described, are all mounted in suitable anti-friction bearings.

To counterbalance the weight of the spindle head 74 and associated parts, a suitable counterweight 112 (Figure 2) is connected to the upper end of the head frame 76 through a flexible element or chain 114. The chain 114 passes over pulleys 116 supported by the center column structure of the machine.

Work table indexing and locating mechanisms

Figure 11:
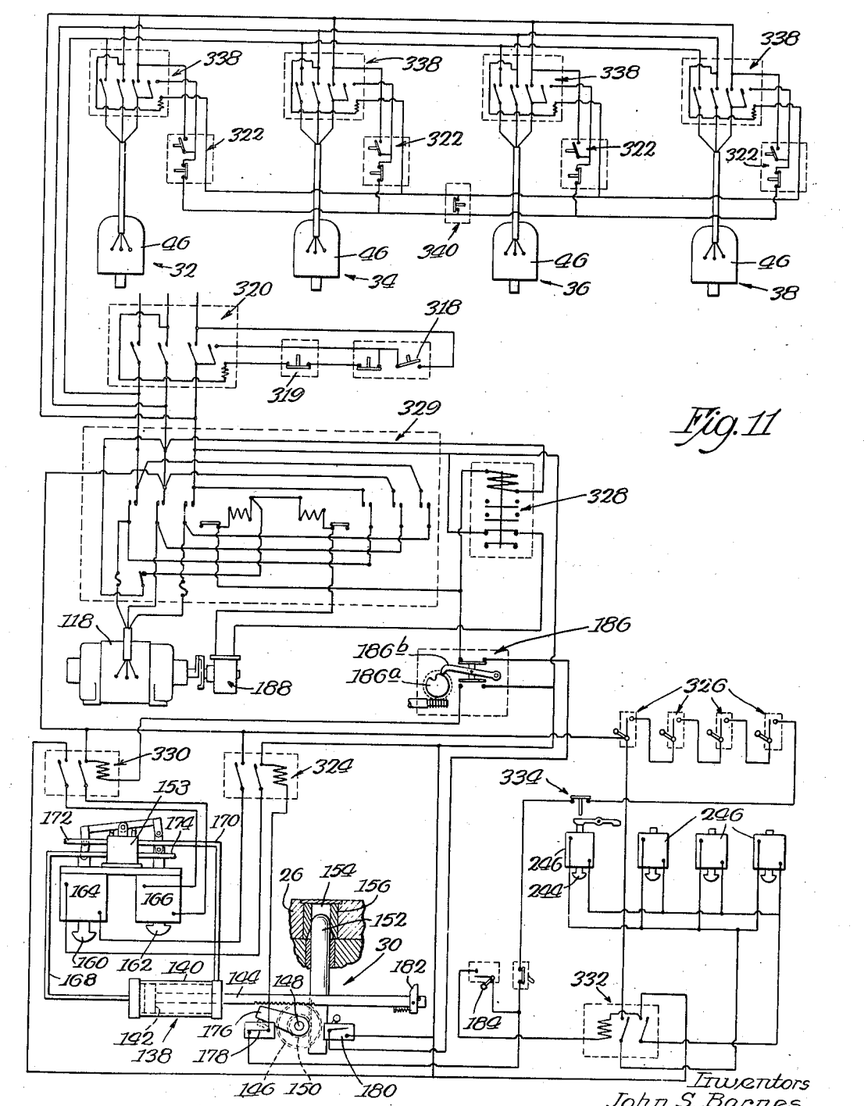
Figure 11 discloses a diagram of the electrical circuits which automatically control the timed functioning of the spindle units and work supporting table.

As previously mentioned, the work supporting table 26 is adapted to be automatically indexed upon the completion of each reciprocation of the spindle heads 74 and this is accomplished by means of the indexing mechanism 28, Figs. 2, 3, and 11. This mechanism 28 includes a prime mover or reversible electric motor 118 which is coupled to a bevel gear 120 through a gear train 122, 124, 126 and 128 (Fig. 3). The bevel gear 120 drives through a companion bevel gear 130, a shaft 132 and a gear 134 (Fig. 2) which meshes with an internal gear 136 mounted on the table 26. By timingly controlling the functioning of the motor 118 in accordance with the position of the spindle heads, the table is indexed subsequent to each reciprocation of the tools. The timed functioning of the motor will be more apparent from the description of the circuit diagram of Fig. 11 which is to follow.

Figures 9, 10:
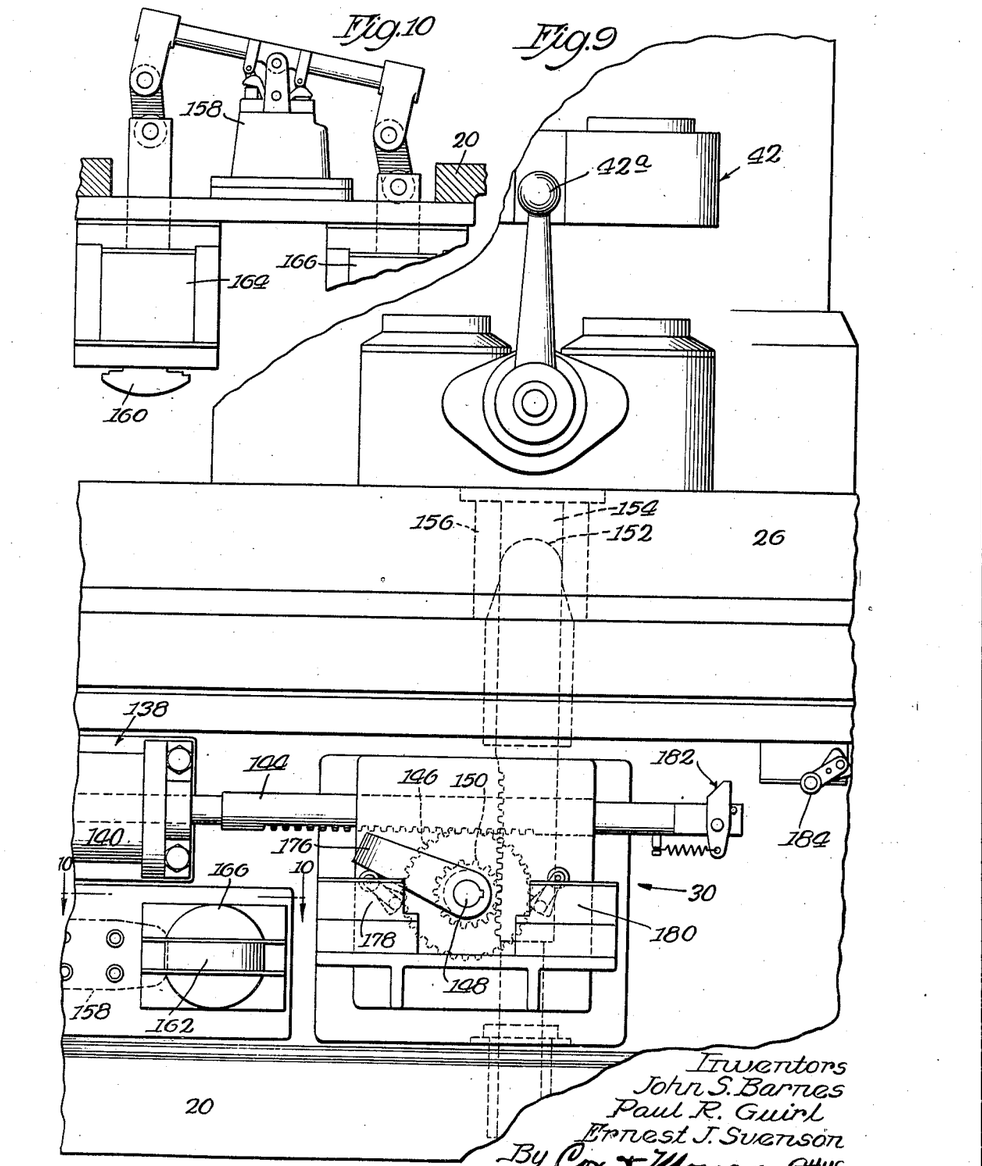
Figure 9 is an enlarged fragmentary front elevational view of the table locating and locking mechanism and the work clamping device.
Figure 10 is an enlarged fragmentary view of the control mechanism of the air valve which governs the functioning of the table, locating or locking mechanism, said view being taken along the line 10—10 of Figure 9.

In timed relation with the operation of the indexing mechanism 28, the mechanism 30 functions to positively locate the table as the table approaches the limit of each indexing movement. Referring to Figs. 2, 9 and 11, it will be seen that the locating mechanism includes a fluid operated actuator 138 comprising a cylinder 140 (Fig. 9), a piston 142 and a piston rod or rack bar 144. The bar 144 meshes with a gear 146 mounted on a shaft 148 (Fig. 11), and the shaft 148 carries a pinion 150 which meshes with companion rack teeth in a vertically shiftable locating or locking pin 152. Thus movement of the actuator piston to the right (Figs. 9 and 11) will cause a downward disengaging movement of the pin 152 and movement to the left will cause said pin to move upwardly into registration with a complementary opening 154 in a bushing 156 carried by the table 26. The movement of the table in response to the index mechanism 28 and the movement of the locating mechanism are so correlated that as the indexing movement approaches completion, the rounded upper end of the pin 152 moves into engagement with the inner periphery of the bushing 156.

The functioning of the actuator 138 may be automatically controlled through the agency of a control valve 158, Figures 9, 10, and 11. Conveniently located cores 160 and 162 may be manually manipulated by the operator, and these cores form an operative element in solenoids 164 and 166, respectively, connected within a circuit about to be described. The valve 158 is connected with opposite ends of the actuator cylinder 140 by conduits or pipe lines 168 and 170, and conduits 172 and 174 serve as intake and return connections for a suitable fluid pump 175 (see Figure 8). Any suitable source of fluid supply such as a fluid pump (not shown) may be employed. This pump may be driven independently of or in synchronism with the machine.

A member or arm 176 mounted on the shaft 148 serves to control switches 178 and 180, later to be described. A finger 182 is adapted, when the rack bar 144 shifts to the right (Figure 11) to close a switch 184. A timing switch 186 is operated through a gear train connected with the motor 118, as shown in Figures 3 and 11. The motor, upon the completion of an indexing movement of the table, is electrically disconnected by a viscosity switch mechanism 188, later to be described.

Hydraulic system of control

Figures 4, 5:
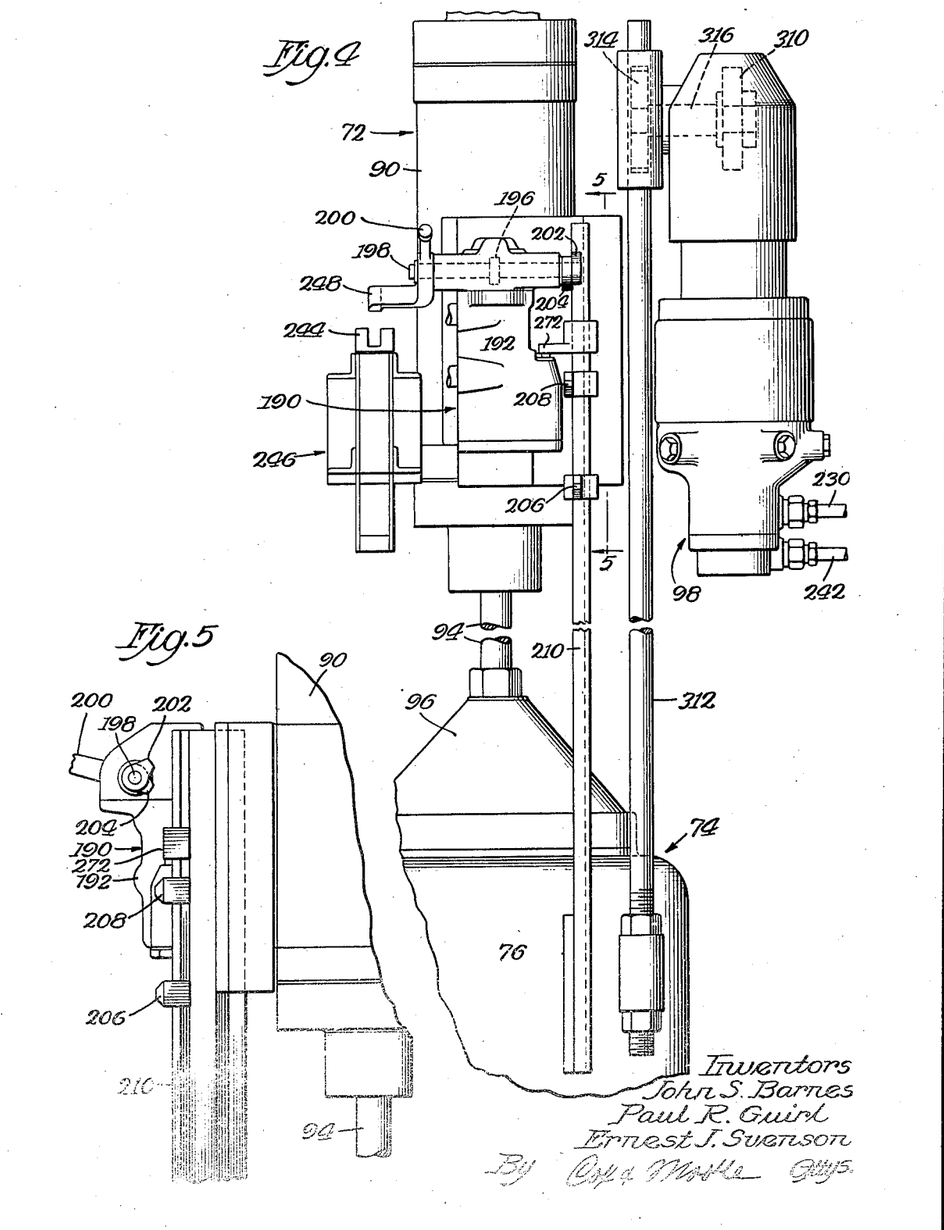
Figure 4 is an enlarged detailed elevational view of the valve-control mechanism shown in association with the hydraulic actuator and feed pump companion thereto, said view being taken substantially along the line 4—4 of Figure 1.
Figure 5 is a fragmentary elevational view of the valve control mechanism taken substantially along the line 5—5 of Figure 4.
Figure 12:
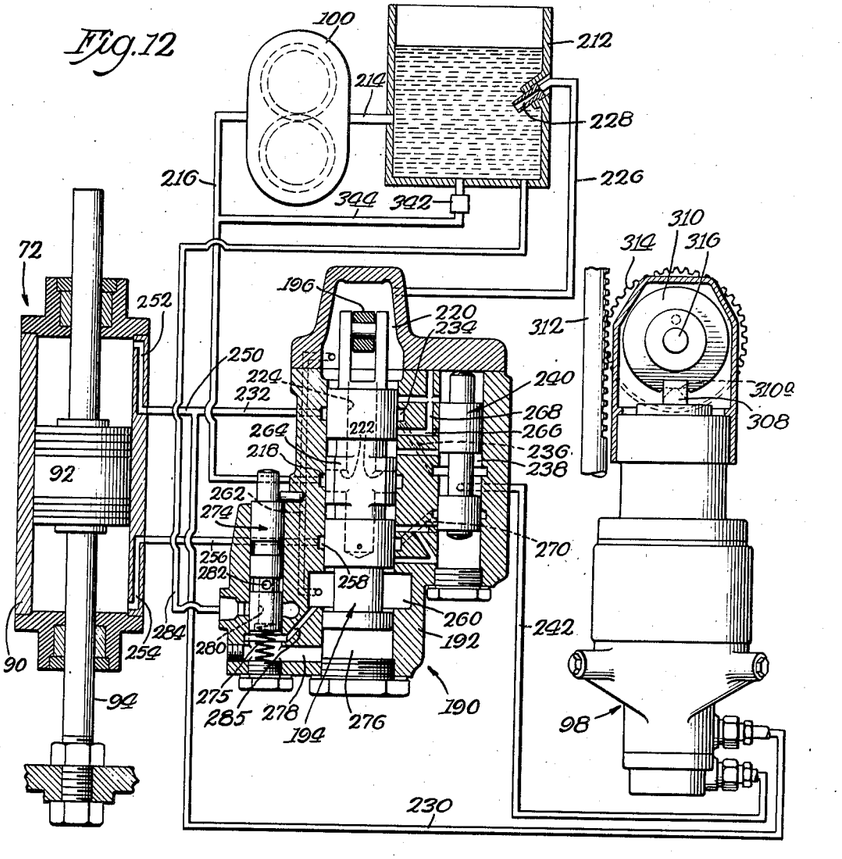
Figure 12 discloses the hydraulic circuit which controls the feed and rapid traverse movements of the cutting tools.

Before taking up in detail the manner in which the locating and indexing mechanisms are automatically controlled, reference at this point is made to the hydraulic system of control shown in Figures 4, 5, and 12. Each spindle driving unit 32, 34, 36, and 38 includes a control valve mechanism 190. The valve mechanism comprises a casing or housing 192 and a main valve member 194 (Figure 12) vertically shiftable within said casing pivotally connected at its upper extremity with an arm 196, which rotates with a horizontal shaft 198. This shaft 198 carries a handle 200 at one extremity to permit of manual manipulation and a pair of fingers 202 and 204 for automatic control, said fingers being adapted to be engaged by dogs 206 and 208, respectively, adjustable mounted upon a vertically shiftable rod 210.

The rod 210 is secured at its lower end to the head frame 76, and hence moves as a unit with said frame. Assume that the rod 210 occupies its raised position, or, in other words, assume that the spindle is in position to begin a downward movement toward the work piece 48 on the table 26. Assume further that the motor 46 is operating, thereby causing the actuation of the feed pump 98 and the rapid traverse pump 100 through gear trains previously described. With the valve member 194 positioned as shown in Figure 12, fluid from a reservoir 212 passes through a conduit 214 into the gear pump 100. A conduit or pipe line 216 directs fluid into an annular passage 218, which now communicates with a longitudinal chamber 220 through radial ports 222 and a longitudinal passage 224. The chamber 220 returns fluid to the reservoir 212 through a conduit 226 and a restricted orifice 228. Thus fluid from the rapid traverse gear pump circulates back to the reservoir under a pressure established by the restricted orifice 228 without imparting movement to the actuator piston 92.

The feed pump, under the above mentioned circumstances, circulates from the discharge side thereof through a conduit 230, conduit 232, annular valve port 234, passage 236, and passage 238 of a valve member 240, and thence through a return conduit 242 to the intake side of said pump.

Assume now that the handle or lever 200 is shifted downwardly either manually or in response to the upward movement of a plunger 244 of a solenoid 246, which plunger is adapted to engage an inwardly extending arm 248 formed integral with the handle 200. This causes the valve member 194 to be shifted upwardly to its rapid approach position. In this position fluid from the pump 100 is directed by the valve member 194 from the annular port 218 to the annular port 234 and into the upper end of the actuator cylinder 90 through the conduit 232 and the conduit 250, which communicates with a passage 252. Fluid from the advancing side of the piston 92 passes through a passage 254, conduit 256, and valve port 258, which now communicates with a chamber 260. The chamber 260, through a longitudinal passage 262, communicates with the discharge chamber 220, previously described.

At this point it should be understood that when the valve member 194 initially moves toward its rapid approach position, the valve member 240 is automatically shifted downwardly in response to the sudden increase in pressure occasioned within the side area 264 as restriction in communication takes place between the annular passage or port 218 and the radial ports 222. This increase in pressure is transmitted through passages 266 and 268 within the valve casing 192, which communicate with the upper end of the valve member 240. By shifting the valve 240 to its lower position, the feed pump is conditioned for delivering fluid to the upper end of the actuator 72 when the rapid traverse pump 100 is cut off.

As the head frame 76 moves downwardly, the dog 208 at a preselected interval engages the finger 204, thereby automatically shifting the valve member to the neutral position shown in Figure 12. Fluid at high pressure from the feed pump 98 enters the upper end of the actuator 72, and fluid from the advancing end of the actuator returns through the annular valve port 258, which now communicates with the return conduit through a passage 270 and the valve passage 238.

As the tools on the spindles 44 complete their cutting stroke, a dog 272 on the rod 210 engages a valve member 274 and shifts said valve downwardly against the action of a coiled spring 275. In its lowered position the valve establishes unrestricted communication between an end chamber 276 of the valve 190 and the reservoir 212 through the following passages 278, 280, 282, and 284, after the valve member 274 has been shifted sufficiently to close communication between chambers 260 and 276 through a passage 285. The normal balancing pressure of the fluid within the chamber 220 causes the valve member 194 to suddenly shift downwardly to its rapid reverse position. This causes the valve member 240 to shift upwardly to its fluid circulating position, and makes fluid from the rapid traverse pump 100 enter the lower end of the actuator cylinder 90. When the tools have been shifted to their starting position, the machine may be manually stopped or a second cycle of reciprocation automatically initiated in a manner about to be described.

Slow feed control

It is very desirable in instances where the tools must be subjected to heavy duty during a portion of their cutting stroke, to cut down the rate of feed during that period of the stroke. To accomplish this, the present invention contemplates the use of a device which serves to vary the displacement of the feed or plunger pump 98. This pump includes a cylinder block 286, which supports a plurality of reciprocable plungers 288 (Figure 8). These plungers are driven by means of a rotary eccentric driving ring 290. The ring 290 is supported at the lower end of a driving member 292 which rotates with a driving sleeve 294 mounted within anti-friction bearings 296. To vary the eccentricity of the driving ring 290, it is only necessary to laterally shift the member 292 within the sleeve 294. This is accomplished through the agency of a member 298 which is longitudinally adjustable within the sleeve 294. The lower end of the member 298 has an inclined projection 300, which extends within a complementary inclined recess in the member 292. Thus, when the member 298 is moved upwardly, the eccentricity of the driving ring 290 is varied so as to decrease the stroke of the plungers, and hence decreases the rate of fluid displacement. This causes the actuator piston 92 to experience a slower rate of feed.

A coiled spring 302 constantly urges the member 298 upwardly by acting against the under side of a sleeve 304, which carries an anti-friction thrust bearing 306. A projection or follower member 308 is constantly urged against the surface of a cam member 310. This cam member is provided with a recess 310a, which, when it registers with the follower member 308, enables the coiled spring 302 to shift the control member 298 upwardly so as to decrease the feed of the pump 98.

A timed rotation of the cam 310 takes place in response to the movement of a rack bar or rod 312, the lower end of which is connected with the head frame 76, Figure 4. The upper end of the bar 312 is provided with rack teeth which mesh with a gear 314 on a shaft 316. This shaft also supports the cam 310. Thus, the rotation of the cam is so timed that as the tools begin their cut in a heavy section of the work piece 40, the recess 310a will register with the follower member 308. Obviously the cam may be designed to suit any particular type of work piece.

Statement of operation

Thus far the description has been directed to the individual mechanisms, which cause the spindle units and work table to function. The complete hydro-electric, automatic control of the machine may best be understood by describing a complete cycle of operation. A work piece 40 is first clamped within a holder 42 at station No. 1 (Figure 3). By turning a hand lever 42a, a clamping jaw 42c (Figure 2), is tightened against the work piece. Bushings provided in the holder serve as guides for the complementary spindles 44.

By depressing a start button 318, Figure 11, a master switch 320 is closed, and hence power is available in all circuits whereby magnetic switch 324 is closed, provided all of the spindle heads are in starting position. This causes current to pass through switch 178 and switches 326 and 334. By depressing each start button 322, the spindle driving motors are started through suitable switches 338. The switch 326 is operated by means of a dog 326a as shown in Figure 3. The solenoid 164 being thus energized, operates the valve 158, admitting fluid under pressure from the pump 175 into the left end of the actuator 138 (Figure 11). This causes the downward withdrawal of the locking pin 152, the opening of the switch 178, and closing of the switch 180. Closing the limit switch 180 starts the motor 118 in a forward direction, so as to cause movement of the table in a clockwise direction, as viewed from above.

The viscosity switch 188 maintains the motor 118 electrically connected within the circuit as long as the motor rotates in a direction which causes the table 26 to be indexed. However, when the motor rotates in an opposite direction, the switch 188 opens to disconnect said motor. It will be noted that due to the action of the rack 144 and lever 176, operation of the switch 180 causes relay 328 to reverse the motor 118 through the reversing switch 329. However, as soon as the motor experiences reverse rotation, the switch 188 opens. The table rotates until the timing switch 186 closes a switch 330, which controls the valve 158, by energizing the solenoid 166, and causing the valve 158 to direct fluid to the right end of the actuator 138. This causes the locking or locating pin 152 to move upwardly. The plugging action of the switch 188 then takes place so as to stop the motor 118. The rounded end surface of the pin engages the inner periphery of the bushing 156, and causes the table to experience, as a result of this engagement, a slight final movement after the motor 118 has been arrested. This slight movement is sufficient to cause a switch element 186a to rotate a distance which positions an arm 186b, as shown in Figure 11, thereby conditioning the switch mechanism 186 for starting the indexing motor 118 during the subsequent cycle of reciprocation. The movement of the rack bar 144 to the right (Figure 11) also causes the finger 182 to close the switch 184, thus closing a magnetic switch 332, which causes the solenoids 246 to be energized. This causes the plungers 244 to engage the lever arm 248 and thereby automatically shift the valve 194 to its rapid approach position to repeat another cycle of reciprocation. It will, of course, be remembered that during each forward movement of the spindle heads 74, the rapid traverse, feed and slow feed thereof is controlled by the mechanisms previously described.

Attention is directed to the fact that a circuit breaker 334 is provided, which is held open so as to prevent a repetition of the indexing cycle until the spindle heads have returned to the starting position. When the spindle heads return to their starting or stopping position, the switch 324 is closed through limit switches 178 and 326, and the indexing operation previously described is repeated.

Figure 13:
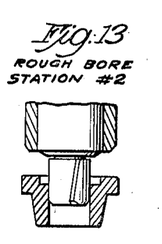
Figures 13, 14, 15, and 16, respectively, show the successive operations performed upon a work piece during a complete cycle of operation of the machine.
Figure 14:
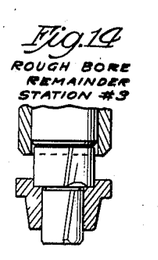
Figure 15:
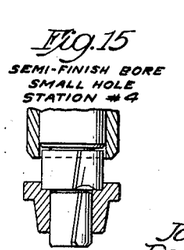
Figure 16:
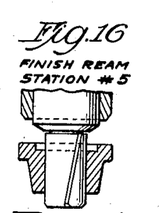

During the first cutting operation at station No. 2, a rough bore of the small hole half way through takes place (see Figure 13). At station No. 3 a rough bore of the remainder of the small hole and a roughing of the counterbore occur, as well as the rough bore of the large hole (see Figure 14). At station No. 4 a semi-finish bore of the small hole, a finish of the counterbore and a semi-finish bore of the large hole take place. At station No. 5 a finish ream of the small hole and finish ream of the large hole occurs. From station No. 5 the completed work piece is indexed to station No. 1. At station No. 1 the completed work piece is replaced by another piece to be machined. From the foregoing it will be apparent that during the cycle of reciprocation of the heads 74, the machining of one work piece is completed and another put in its place to be subsequently machined. This series of operations continues until the stop buttons 318 or 319 are depressed or the snap switch 336 is opened. It will also be noted that each motor 46 is provided with an independent magnetic switch 338 controlled by push-button switches 322 and 340. The latter switch serves to simultaneously stop all of the motors 46. The switch 319 is preferably an emergency foot-operated device. A relief valve 342 may be employed in the conduit 344, which connects with the conduit 216 (Figure 12).

*Summary*

From the foregoing description it will be apparent that the present invention contemplates the provision of a machine tool of rigid and durable construction having relatively few parts. The invention also contemplates systems of control previously described, of hydraulic and electrical types which enable a series of different operations to be performed upon a work piece until completed in a very efficient and effective manner.

From the foregoing description it will be apparent that the invention contemplates the provision of a machine tool, in which a plurality of working units, such as the units 32, 34, 36, and 38, are readily attachable to any convenient mounting. In the present disclosure we have shown these units mounted upon a vertical column, but it will be obvious that said units may be associated in any desired number with a support or mounting disposed in any plane. Thus, the invention contemplates a machine which is readily adaptable for a wide range of work without requiring complete rebuilding of the machine, and this is of very practical significance in the machine tool art, where machines of the type shown herein are relatively expensive when it is necessary to rebuild a machine to suit a particular type of work.

By having each of the above mentioned work units independently controlled to perform any particular cycle of operation in combination with a control which governs all of the working units, makes for simplicity in construction and efficiency in operation. This arrangement of the working units reduces the hazards and delay caused by breakage, etc. Any of the working units described herein, because of their independent functioning, may be rendered functionally inoperative without affecting the operative functioning of the other units. Furthermore, each working unit may be replaced or repaired with a minimum loss of time, thereby enabling the continuous operation of the machine, as distinguished from other conventional types with which we are familiar, wherein the breakdown of one of the tool driving mechanisms requires an extended period of time and a complete rebuilding operation to place the machine in condition for continued functioning.

The closed feeding circuit with the slow feed control also presents a very practical and efficiently operable arrangement, particularly as it relates to the working unit feature just referred to. The variation in feed may be independently controlled by each unit, although the functioning of all the units may be controlled from a single point. The hydro-electric controls hereinbefore described in combination with a working unit and other novel features render the machine foolproof and operable with a minimum amount of skill and effort on the part of the attendant.

It will also be apparent that the invention precludes the necessity of using conventional clutches and the like. The improved hydraulic arrangement enables the feed pump to be constantly driven. By causing the feed pump 98 to circulate through the valve member 240, no clutch devices are required. This makes for simplicity in design and eliminates frictional losses, slippage, etc., experienced when conventional transmissions are used.

By having the power means, which rotates the spindle and propels the feed pump arranged as disclosed herein, a truly "synchronized" operation of spindle rotation and spindle translation is obtained. This "synchronized" feature of operation materially enhances the functional efficiency of the machine. This phase of the invention is of particular importance in connection with the use of tungsten carbide tools and the like, the use of which presents new requirements for safety and positive interlocking of the various co-acting rotary and feeding mechanisms in a machine tool.

While certain specific structural features have been shown for illustrating one embodiment of the invention, it must be understood that said invention is in no sense limited to said embodiment, but is capable of numerous other changes and modifications without departing from the spirit and scope of the appended claims.

Having thus described our invention, what we claim as new and desire to obtain by Letters Patent is:

1. A center column machine including a base, an upright center column section, a plurality of spindle carrying units disposed about said column, each unit being driven from a prime mover such as an electric motor and including a transmission drivingly associated with said prime mover, a feed pump driven from said transmission, a rapid traverse pump driven from said transmission, a hydraulic actuator operably connectable with said pumps, a valve mechanism for controlling the timed functioning of said pumps, and a spindle supporting member having a machine spindle driven from said transmission, said spindle supporting member being operatively coupled with said actuator, a supporting table, and control means for governing the timed functioning of said spindle units.

2. A center column machine including a base, an upright center column section, a plurality of spindle carrying units disposed about said column, each unit being driven from a prime mover such as an electric motor and including a transmission drivingly associated with said prime mover, a feed pump driven from said transmission, a rapid traverse pump driven from said transmission, a hydraulic actuator operably connectable with said pumps, a valve mechanism for controlling the timed functioning of said pumps, and a spindle supporting member having a machine spindle driven from said transmission through a splined shaft connection, said spindle supporting member being operatively coupled with said actuator, a supported table, and control means for governing the timed actuation of said spindle units.

3. A center column machine including a base, an upright center column section, a plurality of spindle carrying units disposed about said column, each unit being driven from a prime mover such as an electric motor and including a transmission drivingly associated with said prime mover, a feed pump driven from said transmission, a rapid traverse pump driven from said transmission, a hydraulic actuator operably connectable with said pumps, a valve mechanism for controlling the timed functioning of said pumps, and a spindle supporting member having a machine spindle driven from said transmission, said spindle supporting member being operatively coupled with said actuator, a supporting table, an indexing mechanism for successively shifting said table after each downward movement of the spindle supporting members, a locating and locking means for said table, and means for effecting the timed automatic functioning of said units and supporting table whereby upon the completion of each reciprocating cycle of the spindle supporting members, said table indexing and locking means will automatically function, and said supporting members will automatically perform successive cycles of reciprocation.

4. A machine tool including a rotary supporting spindle, driving means therefor, a second support, one of said supports being adapted to hold a cutting tool and the other a work piece, said supports being relatively movable to effect the cutting action upon a supported work piece during the rotation of said spindle, power means for causing rapid relative movement between said supports to effect relative translation of said spindle, power means for causing a feeding rate of translation during a portion of the cutting operation and a slower feeding translation during another portion of the cutting operation, means for rendering the rotation and relative translation of said spindle synchronous, and a frame structure for detachably receiving one of said supports and said feed and rapid traverse power means.

5. A machine tool including a rotary supporting spindle, driving means therefor, a second support, one of said supports being adapted to hold a cutting tool and the other a work piece, said supports being relatively movable to effect the cutting action upon a supported work piece during the rotation of said spindle, power means for causing rapid relative movement between said supports to effect relative translation of said spindle, hydraulic power means for causing a feeding rate of translation during a portion of the cutting operation and a slower feeding translation during another portion of the cutting operation, means for rendering the rotation and the relative translation of said spindle synchronous, and a frame structure for detachably receiving one of said supports and said hydraulic feed and rapid traverse power means.

6. A machine tool including a center column section, a base therefor, an indexable work supporting table, a plurality of spindle supporting means shiftable toward and away from work pieces supported by said table, means for rotating the spindles in said supporting means, means for imparting a rapid traverse movement to said supporting means, means for imparting a given feeding movement to said supporting means during a portion of the working stroke thereof and for imparting a slower feeding movement during another portion of said working stroke, power operated indexing mechanism for indexing said table, and control means operable as an incident to the shifting of said supporting means to a preselected position for automatically rendering said indexing mechanism functionally operable to index said table.

7. A machine tool including a center column section, a base therefor, an indexable supporting table, a plurality of spindle supporting means shiftable toward and away from said table, means for imparting a rapid traverse movement to said supporting means, hydraulic means companion to each supporting means for imparting a given feeding movement to said supporting means during a portion of the working stroke thereof and for imparting a slower feeding movement during another portion of said working stroke, power operated indexing mechanism for indexing said table, and control means operable as an incident to the shifting of said supporting means to a preselected position for automatically rendering said indexing transmission functionally operable to index said table.

8. In a machine tool of the vertical center column type, a supporting center column and a supporting base therefor, an indexable supporting table, a power transmission for indexing said table, a plurality of spindle carrying heads supported by said center column for relative translation, work-holding means associated with said spindle heads and table, means for imparting relative rapid traverse movements to said heads in a direction toward and away from said work-holding means, fluid transmission means including a hydraulic actuator for imparting a relative feeding movement between said spindle heads and said work-holding means, valve means for connecting said fluid transmission means in a closed circuit and for controlling the timed functioning of said closed circuit and said rapid traverse movements, and a control circuit operable at a preselected position of said carrying heads for initiating said table power transmission and thereby causing the indexing of said table.

9. In a machine tool structure of the upright type, an upright support including a base for said support, a spindle carrier vertically reciprocable on and supported by said upright support, a work-supporting table beneath said spindle carrier, fluid transmission means including a hydraulic actuator for imparting a feeding movement to said spindle carrier and for imparting rapid traverse in both directions to the carrier, shiftable valve means for establishing a closed fluid circuit during said feeding movement and for positively controlling the rapid traverse movement, and control cam means for shifting said valve means in timed relation with the speed of movement of said spindle carrier whereby said closed fluid circuit is positively established at a preselected point of travel irrespective of pressure condition in said fluid transmission means.

10. In a variable fluid transmission system for machine tools and the like, a shiftable supporting carriage, means for shifting said carriage, control means therefor, a pump body having a plurality of pistons reciprocable within said body, a rotary means including an anti-friction bearing for reciprocating said pistons, an axially shiftable member for supporting and shifting said rotary means, and means controlled by said supporting carriage for shifting said axially shiftable means to thereby vary the amount of reciprocation of said pistons in timed relation with the shifting of said supporting carriage.

11. In an automatically variable fluid transmission system for machine tools and the like, a plurality of automatically variable displacement pumps, a fluid actuator companion to and connectable with each of said pumps for propelling purposes, a plurality of constant delivery pumps, one pump companion to each of said fluid actuators, shiftable valve means companion to each of said fluid actuators for establishing the effective propulsion of said actuator by a preselected pump to thereby control the propelling speed of said actuator, control cam means for shifting said valve means in timed relation with the shifting of said hydraulic actuator, means operable in response to the fluid flow from said variable displacement pump for further varying the propelling speed of said actuator, and automatic initiating means operable at a preselected point in the cycle of actuation for causing the actuation of a plurality of said shiftable valve means.

12. A center column machine including a base, an upright center column section, a plurality of spindle carrying units disposed about said column, each unit being driven from a prime mover such as an electric motor and including a transmission drivingly associated with said prime mover, a feed pump driven from said transmission, a rapid traverse pump driven from said transmission, a hydraulic actuator operably connectable with said pumps, a valve mechanism for controlling the timed functioning of said pumps, and a spindle supporting member having a machine spindle driven from said transmission, said spindle supporting member being operatively coupled with said actuator, a supporting table, control means for governing the timed functioning of said spindle units, and power means for causing relative transverse shifting between said spindle units and said supporting table.

13. A machine tool including a rotary supporting spindle, driving means therefor, a second support, one of said supports being adapted to hold a cutting tool and the other a work piece, said supports being relatively movable to effect the cutting action upon a supported work piece during the rotation of said spindle, power means for causing rapid relative movement between said supports to effect relative translation of said spindle, power means for causing a feeding rate of translation during a portion of the cutting operation and a slower feeding translation during another portion of the cutting operation, means for rendering the rotation and relative translation of said spindle synchronous, a frame structure for detachably receiving one of said supports and said feed and rapid traverse power means, and power means for causing relative transverse shifting between said rotary supporting spindle and said second support.

14. A machine tool including a rotary supporting spindle, driving means therefor, a second support, one of said supports being adapted to hold a cutting tool and the other a work piece, said supports being relatively movable to effect the cutting action upon a supported work piece during the rotation of said spindle, power means for causing rapid relative movement between said supports to effect relative translation of said spindle, hydraulic power means for causing a feeding rate of translation during a portion of the cutting operation and a slower feeding translation during another portion of the cutting operation, means for rendering the rotation and the relative translation of said spindle synchronous, a frame structure for detachably receiving one of said supports and said hydraulic feed and rapid traverse power means, and power means for causing relative transverse shifting between the rotary supporting spindle and said second support.

15. A machine tool including a center column section, a base therefor, a supporting table, a plurality of spindle supporting means, said spindle supporting means and table being relatively shiftable toward and away from each other, means for rotating the spindles, means for imparting relative rapid traverse movement between said spindle supporting means and table, means for imparting a given feeding movement between said spindle supporting means and table for a portion of the working stroke and for imparting a slower feeding movement during another portion of said working stroke, power operated means for causing relative transverse index shifting between said spindle supporting means and said table, and control means operable in response to the relative shifting of said spindle supporting means and table toward each other to a preselected position for automatically rendering said power operated mechanism functionally operable to effect relative index movement between said spindle supporting means and table.

16. In an automatically variable fluid transmission system for machine tools and the like, a plurality of automatically variable displacement pumps, a fluid actuator companion to and connectable with each of said pumps for propelling purposes, a plurality of constant delivery pumps, one pump companion to each of said fluid actuators, shiftable valve means companion to each of said fluid actuators for establishing the effective propulsion of said actuator by a preselected pump to thereby control the propelling speed of said actuator, control cam means for shifting said valve means in timed relation with the shifting of said hydraulic actuator, means operable in response to the fluid flow from said variable displacement pump for further varying the propelling speed of said actuator, and automatic electrical initiating means operable at a preselected point in the cycle of actuation for causing a simultaneous actuation of a plurality of said shiftable valve means.

JOHN S. BARNES.
PAUL R. GUIRL.
ERNEST J. SVENSON.